United States Patent [19]
Reeb et al.

[11]  4,448,923
[45]  May 15, 1984

[54] INTERPOLYMER LATEX, PROCESS FOR ITS PREPARATION AND USE OF THE LATEX FOR COATING PAPER

[75] Inventors: Roland Reeb, Temblay-/les-Gonesse; Bernard Chauvel, Ermont, both of France

[73] Assignee: Rhone Poulenc Specialites Chimiques, Courbevoie, France

[21] Appl. No.: 476,257

[22] Filed: Mar. 17, 1983

[30] Foreign Application Priority Data

Mar. 24, 1982 [FR] France ............................ 82 04989

[51] Int. Cl.$^3$ ............................................. C08L 25/10
[52] U.S. Cl. ................................... 524/460; 428/511; 524/447; 524/504; 525/261; 525/292
[58] Field of Search ............... 524/460, 504; 525/261, 525/292; 428/511

[56] References Cited

U.S. PATENT DOCUMENTS

| | | | |
|---|---|---|---|
| 4,108,946 | 8/1978 | Kamada et al. | 524/460 |
| 4,238,577 | 12/1980 | Arendt | 525/292 |
| 4,265,977 | 5/1981 | Kawamura et al. | 428/511 |
| 4,328,149 | 5/1982 | Morse et al. | 524/460 |

FOREIGN PATENT DOCUMENTS 1358204  7/1974  United Kingdom .

OTHER PUBLICATIONS

Chemical Abstracts, vol. 83, 1975, Abstract 180223y.

*Primary Examiner*—Ronald W. Griffin
*Attorney, Agent, or Firm*—Finnegan, Henderson, Farabow, Garrett & Dunner

[57] ABSTRACT

Latex of an interpolymer composed of (1) a copolymer A of butadiene, styrene and at least one ethylenically unsaturated carboxylic acid, and (2) a polymer B of at least one halogenoalkyl or halogenoacetoxyalkyl ester of an ethylenically unsaturated monocarboxylic or dicarboxylic acid, polymer B being at least partially grafted onto the copolymer A.

The latex is prepared by the emulsion polymerization of butadiene, styrene and at least one copolymerizable, ethylenically unsaturated carboxylic acid to form a copolymer latex, followed by the polymerization in the presence of the copolymer latex of a halogenoalkyl or halogenoacetoxyalkyl ester of an ethylenically unsaturated monocarboxylic or dicarboxylic acid.

The latex may be used as a binder in aqueous compositions for coating paper.

16 Claims, No Drawings

INTERPOLYMER LATEX, PROCESS FOR ITS PREPARATION AND USE OF THE LATEX FOR COATING PAPER

BACKGROUND OF THE INVENTION

The present invention relates to interpolymer latices and to a process for their preparation. It also relates to the applications of these latices, especially as binders and more particularly in the coating of paper.

The latices forming the subject of the invention are aqueous dispersions of particles, having a diameter essentially between 0.1 and 1 μm (micron) and preferably between 0.1 and less than 0.5 μm, of an interpolymer comprising (a) a copolymer A of butadiene, sytrene and at least one ethylenically unsaturated carboxylic acid, and (b) a polymer B of at least one halogenoalkyl or halogenoacetoxyalkyl ester of an ethylenically unsaturated monocarboxylic or dicarboxylic acid, polymer B being at least partially grafted onto the copolymer A.

For the purposes of simplification, the terms "halogenoalkyl ester" and "halogenoacetoxyalkyl ester" hereafter respectively denote either a halogenoalkyl or halogenoacetoxyalkyl ester of a monocarboxylic acid, or a halogenoalkyl or halogenoacetoxylalkyl monoester or diester of a dicarboxylic acid. Use of mixtures of halogenoalkyl ester and halogenoacetoxyalkyl ester is contemplated.

The interpolymer preferably comprises 85 to 99% by weight of copolymer A and 15 to 1% by weight of polymer B.

The copolymer A comprises, by weight, 15 to 85% by butadiene, 5 to 84% of styrene and 1 to 10% of at least one ethylenically unsaturated carboxylic acid, and preferably 25 to 55% by butadiene, 35 to 74% of styrene and 2 to 5%, of at least one ethylenically unsaturated carboxylic acid.

The polymer B comprises, by weight, 15 to 100% of halogenoalkyl or halogenoacetoxyalkyl ester and 0 to 85% of at least one ethylenically unsaturated compound which can be copolymerized with the halogenoalkyl or halogenoacetoxyalkyl ester.

According to the invention, the halogenoalkyl or halogenoacetoxyalkyl ester can be represented by the general formula: RCOOZ, in which formula Z represents:

the radical $-C_nH_{2n-m+1}X_m$, in which X represents a halogen atom, preferably chlorine and/or bromine, n is an integer ranging from 1 to 6 and preferably from 1 to 4, and m is a integer ranging from 1 to 5 and preferably from 1 to 3; or the radical $-(CH_2-CHY)_{n'}-OOC-CH_{(3-m')}X_{m'}$, in which X has the same definition as above, n' is an integer from 1 to 4, m' is an integer from 1 to 3, and Y represents a hydrogen atom or a methyl group; and R represents:
a linear or branched $C_2-C_4$ alkenyl group;
a linear or branched $C_2-C_4$ chloroalkenyl group; or
a radical $-R'-COOZ'$, in which Z' represents a hydrogen atom or the radical Z, and R' represents a linear or branched $C_2-C_4$ alkenylene group, a linear or branched $C_2-C_4$ chloroalkenylene group or a group $$CH_2=C-CH_2-.$$

Representative halogenoalkyl or halogenoacetoxyalkyl esters are those derived from ethylenically unsaturated carboxylic acids possessing up to 6 carbon atoms, such as acrylic, methacrylic, itaconic, crotonic, fumaric, maleic, mesaconic and glutaconic acids, and also their chlorine derivatives such as chloroacrylic, chlorofumaric, chloromaleic and chloroitaconic acids.

According to an embodiment of the invention, that part of the interpolymer which is insoluble in isopropyl alcohol represents at least 75%, preferably 90 to 95%, of the interpolymer and includes, in the grafted state, 0.2 to 15% by weight (preferably 0.5 to 5% by weight) of the halogenoalkyl or halogenoacetoxyalkyl ester.

The proportion by weight of solids in the latices forming the subject of the invention is generally between 1 and 70% and preferably between 30 and 55%.

Amongst the ethylenically unsaturated carboxylic acids forming part of the composition of the copolymer A and, if appropriate, of the polymer B, there may be mentioned, in particular, acrylic, methacrylic, crotonic, maleic, fumaric, itaconic, mesaconic and glutaconic acids or mixtures of at least two of these acids.

As compounds which can be copolymerized to form polymer B with the halogenoalkyl or halogenoacetoxyalkyl ester, there may be mentioned, in particular, vinylaromatic compounds, vinyl halides, vinylidene halides, dienic compounds, carboxylic acid vinyl esters and acrylic compounds. There may be mentioned, more particularly, styrene, α-methylstyrene, para-tert.-butylstyrene, chlorostyrene, vinyltoluene, vinyl chloride, vinyl bromide, vinyl fluoride, vinylidene chloride, butadiene, isoprene, chloroprene, acrylic, methacrylic, maleic, fumaric and itaconic acids and chlorine derivatives of these acids, acrylamide, methacrylamide, acrylonitrile, methacrylonitrile, chloroacrylonitrile, vinyl acetate, acrylic acid esters such as methyl acrylate, ethyl acrylate, hydroxyethyl acrylate, hydroxypropyl acrylate, n-butyl acrylate and isobutyl acrylate, and methacrylic acid esters such as methyl methacrylate, ethyl methacrylate, hydroxyethyl methacrylate, hydroxypropyl methacrylate, n-butyl methacrylate and isobutyl methacrylate.

The process of the preparation of the latices according to the invention comprises the steps of preparing a latex of copolymer A by the emulsion polymerization of butadiene, styrene and at least one ethylenically unsaturated carboxylic acid, and then, in the presence of the latex of copolymer A, polymerizing the halogenoalkyl or halogenoacetoxyalkyl ester and, if appropriate, at least one ethylenically unsaturated compound which can be copolymerized with the halogenoalkyl or halogenoacetoxyalkyl ester.

The latex of copolymer A is prepared in a manner which is in itself known by the polymerization in aqueous emulsion of butadiene, styrene and at least one ethylenically unsaturated carboxylic acid, in the presence of at least one initiator and of at least one emulsifying agent, the concentration of the mixture of monomers in the reaction medium generally being between 20 and 60% by weight.

According to an embodiment of the invention, the halogenoalkyl or halogenoacetoxyalkyl ester, by itself or in the presence of at least one other ethylenic compound, is introduced during the polymerization of the comonomers of A and, preferably, after the comonomers of A have been copolymerized to copolymer A with a degree of conversion of at least 50%.

In the preparation of the copolymer A, the butadiene generally represents between 15 and 85% and preferably between 25 and 55% by weight of the total weight of the monomers to be polymerized. The styrene generally represents between 5 and 84% and preferably between 35 and 74% by weight of the total weight of the monomers to be polymerized. The amount of carboxylic acid used is generally between 1 and 10%, preferably from 2 to 5% by weight relative to the total weight of the monomers to be polymerized.

The monomers used can be introduced into the reaction medium in a mixture or separately and simultaneously, either all at once before the start of the polymerization, or in successive portions or continuously during the polymerization.

The emulsifying agents used are conventional anionic agents represented, in particular, by the fatty acid salts, alkylsulfates, alkylsulfonates, aryl-sulfates, arylsulfonates, alkylaryl-sulfates, alkylarylsulfonates, sulfosuccinates and alkyl-phosphates of alkali metals, and hydrogenated or unhydrogenated abietic acid salts. They are employed at a rate of 0.01 to 5% by weight relative to the total weight of the monomers.

The initiator, which is water-soluble, is represented more particularly by hydroperoxides such as hydrogen peroxide, cumene hydroperoxide, diisopropylbenzene hydroperoxide and paramenthane hydroperoxide, and by persulfates such as sodium persulfate, potassium persulfate and ammonium persulfate. The initiator is employed in amounts of between 0.05 and 2% by weight relative to the total weight of the monomers. If appropriate, the initiator is combined with a reducing agent such as sodium bisulfite or formaldehyde-sulfoxylate, a polyethyleneamine, a sugar such as dextrose or sucrose, or a metal salt. The amounts of reducing agent used vary from 0 to 3% by weight relative to the total weight of the monomers.

The reaction temperatures, which depends on the initiator used, is generally between 0° and 110° C. and preferably between 25° C. and 90° C.

The polymerization of the halogenoalkyl or halogenoacetoxyalkyl ester and, if appropriate, of a compound which can be copolymerized with the halogenoalkyl or halogenoacetoxyalkyl ester, in the presence of the copolymer A, is carried out in aqueous emulsion, in the presence or absence of an emulsifying agent, a polymerization initiator and, if appropriate, a transfer agent, the total concentration of copolymer A+monomer(s) (halogenoalkyl or halogenoacetoxyalkyl ester(s) and copolymerible compound(s)) in the reaction medium being between 20 and 70% by weight.

The amount of latex of copolymer A used is such that the copolymer A generally represents 80 to 99% by weight of the total weight of copolymer A+monomer(s).

The initiator, which is identical to or different from that used for the preparation of the copolymer A, is chosen from amongst the initiators mentioned above. It is employed in amounts of between 0.05 and 6% by weight relative to the monomer(s).

The emulsifying agent present in the latex of copolymer A is generally sufficient to maintain the stability of the emulsion during the polymerization of polymer B. However, in certain cases, it may be necessary to add an additional amount of an emulsifying agent identical to or different from that used for the preparation of the copolymer A. Representative emulsifying agents are listed above. The emulsifying agent is introduced at a rate of 0 to 2.5% by weight relative to the total weight of copolymer A+monomer(s).

The transfer agent, used in proportions ranging from 0 to 3% by weight relative to the monomer(s), is generally chosen from amongst mercaptans such as N-dodecylmercaptan and tert.—dodecylmercaptan, cyclohexane, and halogenohydrocarbons such as chloroform, bromoform and carbon tetrachloride. The transfer agent controls the proportion of grafted polymer and the length of the grafted molecular chains. It is added to the reaction medium either before the polymerization or during polymerization.

The reaction temperature, which depends on the monomer to be copolymerized with the halogenoalkyl or halogenoacetoxyalkyl ester and on the initiator used, is generally between 0° and 110° C. and preferably between 25° and 90° C.

The latices according to the invention are particularly useful as binders for the preparation of aqueous compositions for coating paper, and more particularly for offset printing paper.

It is known that, in principle, aqueous compositions for coating paper contain pigments and binders. The pigment most commonly used in mineral clay. It is also possible to use a small proportion, relative to the mineral clay, of other pigments such as calcium carbonate, titanium oxide, satin white, hydrargillite, talc or barium sulfate. These pigments are dispersed in water, generally in an alkaline medium and in the presence of dispersing agents, the most important of which are tetrasodium pyrophosphate, sodium hexametaphosphate and low molecular weight polyacrylates, in amounts of between 0.2 and 0.5% by weight relative to the pigments.

These pigments are fixed to the paper by means of binders. Binders which have already been proposed for this application are aqueous latices of a synthetic polymer such as a butadiene/styrene copolymer, a carboxylated butadiene/styrene copolymer, an acrylic polymer or a vinyl acetate polymer, employed either by themselves or in a mixture with natural binders such as starches, proteins or casein, or synthetic binders such as polyvinyl alcohols. A particularly advantageous category of synthetic binders consists of the latices of carboxylated butadiene/styrene copolymers comprising, by weight, 30 to 50% of butadiene, 40 to 68% of styrene and 2 to 10% of at least one ethylenically unsaturated carboxylic acid. Products capable of improving the water retention properties of the coating compositions, such as carboxymethylcelluloses or alginates, can also be combined with the latices.

Finally, the coating compositions can contain a variety of other ingredients such as crosslinking agents, anti-foam agents, slip agents and fluorescent brighteners.

The coating of paper with the aid of the aqueous compositions is carried out by a variety of techniques using a variety of coating machine devices, such as the air knife coating machine, the size press, the Champion coating machine, the Massey coating machine and the trailing doctor. After coating, the paper undergoes a drying operation, which is generally followed by a calendering operation.

Wet picking resistance is a particularly important property for coated offset printing paper. Specifically, the offset printing process, which is based on the repulsion of water by greasy inks, uses water. In four-color offset printing, it is consequently necessary to print the second, third or fourth color in a place which has already been wetted. Thus, to avoid picking in the wet state, which clogs the blanket and the offset presses, it is important for the paper to possess an adequate wet picking resistance.

The wet picking resistance of a coated paper produced by the latices according to the invention is higher than that of a coated paper produced by the latices of the corresponding copolymers A.

Examples 1 to 11 which follow, in which the parts are indicated by weight, illustrate, but do not limit, the invention.

EXAMPLES 1 to 11

Preparation of the copolymer A

The following are introduced into a stainless steel autoclave fitted with a stirrer:
43—parts of butadiene,
53—parts of styrene,
100—parts of deionized water,
2—parts of acrylic acid,
2—parts of itaconic acid,
0.5—parts of sodium lauryl-sulfate,
0.8—parts of ammonium persulfate.

The reaction mixture is heated to and maintained at 75° C. throughout the reaction. After a reaction time of 10 hours, the degree of conversion is of the order of 98%. The unreacted butadiene is degassed. The particles of the latex obtained have a diameter of about 0.15 μm and a composition which is substantially equivalent to that of the reactants used.

Polymerization in the presence of the copolymer A

The number of parts of copolymer A (in the form of the corresponding latex prepared above) and, respectively, bis-(2-chloroethyl) itaconate, bis-(2-chloroethyl) fumarate, bis-(1,3-dichloroisopropyl) itaconate, bis-(2-chloroethyl) maleate, mono-(2-chloroethyl) itaconate, chloroacetoxyethyl methacrylate, dichloroacetoxyethyl methacrylate and trichloroacetoxyethyl methacrylate and, if appropriate, styrene, indicated for each example in tables 1, 1' and 1" are introduced into a stainless steel autoclave fitted with a stirrer.

TABLE 1

| Example | 1 | 2 | 3 | 4 | Control |
|---|---|---|---|---|---|
| Copolymer A | 96 | 96.2 | 95.8 | 96 | 98.8 |
| Bis-(2-chloroethyl) itaconate | 4 | 3.8 | 3 | — | — |
| Bis-(2-chloroethyl) fumarate | — | — | — | 2.8 | — |
| Styrene | — | — | 1.2 | 1.2 | 1.2 |
| Potassium persulfate | 0.16 | 0.15 | 0.17 | 0.16 | 0.05 |

TABLE 1'

| Example | 5 | 6 | 7 | 8 | Control |
|---|---|---|---|---|---|
| Copolymer A | 96 | 95.8 | 95.8 | 95.8 | 98.8 |
| Bis-(1,3-dichloroisopropyl) itaconate | 4 | 3 | — | — | — |
| Bis-(2-chloroethyl) maleate | — | — | — | 3 | — |
| Styrene | — | 1.2 | 1.2 | 1.2 | 1.2 |

TABLE 1'-continued

| Example | 5 | 6 | 7 | 8 | Control |
|---|---|---|---|---|---|
| Potassium persulfate | 0.16 | 0.17 | 0.17 | 0.17 | 0.05 |

TABLE 1"

| Example | 9 | 10 | 11 | Control |
|---|---|---|---|---|
| Copolymer A | 96 | 96 | 96 | 98.8 |
| Chloroacetoxyethyl methacrylate | 4 | — | — | — |
| Dichloroacetoxyethyl methacrylate | — | 4 | — | — |
| Trichloroacetoxyethyl methacrylate | — | — | 4 | — |
| Styrene | — | — | — | 1.2 |
| Potassium persulfate | 0.16 | 0.16 | 0.16 | 0.05 |

An amount of potassium hydroxide corresponding to half the amount of potassium persulfate to be introduced is also added.

The temperature of the reaction medium is brought to 75° C. and the number of parts of potassium persulfate indicated in Tables 1, 1' and 1", dissolved in 10 parts of deionized water, are introduced into the autoclave. This temperature is maintained for 5 hours, the temperature is brought to 85° C. and maintained for 3 hours, and the reaction medium is then cooled to ambient temperature to give an interpolymer latex according to the invention in Examples 1-11.

Table 2 below indicates, for each example, the proportion by weight of solids in the interpolymer latex, the proportion of interpolymer which is insoluble in isopropyl alcohol and the proportion by weight of bis-(2-chloroethyl) itaconate, fumarate or maleate, bis-(1,3-dichloroisopropyl) itaconate, mono-(2-chloroethyl) itaconate or chloroacetoxyethyl, dichloroacetoxyethyl or trichloroacetoxyethyl methacrylate, present in the grafted state, in that part of the interpolymer which is insoluble in isopropyl alcohol.

TABLE 2

| Example | Proportion by weight of solids in the interpolymer latex (%) | Proportion of interpolymer which is insoluble in isopropyl alcohol (%) | Proportion by weight of chloroalkyl or chloroacetoxyalkyl ester in the grafted state in that part of the interpolymer which is insoluble in isopropyl alcohol (%) |
|---|---|---|---|
| 1 | 40.5 | 92.5 | 0.8 |
| 2 | 40.8 | 93.6 | 1.7 |
| 3 | 40.6 | 93.7 | 1.5 |
| 4 | 40.4 | 94.4 | 2 |
| 5 | 40.1 | 94.3 | 2.6 |
| 6 | 40.6 | 94.8 | 2.4 |
| 7 | 40.0 | 92.6 | 0.9 |
| 8 | 41.2 | 92.9 | 0.3 |
| 9 | 37.5 | 95.6 | 2.9 |
| 10 | 40.8 | 94.2 | 1.3 |
| 11 | 41.1 | 94.4 | 0.7 |
| Control | 40.2 | 93.6 | — |

The proportion of interpolymer which is insoluble in isopropyl alcohol is determined by the following method:

On a glass plate, a film with a thickness of 15/100 mm (measured in the wet state) is prepared from the latex to be examined, dried for 2 hours at ambient temperature and then dried for 2 hours in an oven at 50° C. A sample of interpolymer having a weight Po of about 200 mg is taken from this film and placed in a sachet made from a filter paper. The sachet containing the interpolymer is suspended for 7 hours in isopropyl alcohol heated under reflux. After the sachet has been drained and dried on dry filter paper and the isopropyl alcohol has been removed by leaving the sample of interpolymer in an oven at 110° C. for 3 hours, the weight P of the said sample is determined. The proportion of interpolymer which is insoluble in isopropyl alcohol is given by the ratio (P/Po), expressed as a percentage.

The proportion of weight of halogenoalkyl or halogenoacetoxyalkyl ester, present in the grafted state, in that part of the interpolymer which is insoluble in isopropyl alcohol, is measured by determining the chlorine content of the said part of the interpolymer of elementary analysis.

Application of the interpolymer latex of the invention to the coating of paper

Aqueous coating compositions are prepared and a layer weighing 20 g/m², expressed as solids, of each of the compositions tested is applied, using an air knife coating machine, to paper weighing 60 g/m². The coated paper is dried in a tunnel oven at a temperature of 120° C. and then undergoes a calendering operation consisting of four successive passes between two rolls under a force of 80 kN per meter.

After drying and calendering, the coated paper is conditioned at a temperature of 23° C. in an atmosphere of 50% relative humidity. The wet picking resistance of the conditioned paper is determined using the IGT instrument developed by the "Institut von Grafische Technik" in Amsterdam (Holland), wherein a sample of coated paper, on which a thin film of water has been deposited beforehand, is brought into contact with an inking roll, the pressure of the roll on the sample being set at a chosen value. The ink "3801" marketed by the Etablissements Lorilleux Lefranc (Paris) is used. The printing speed is increased until one observes that the coated layer is starting to pick. The wet picking resistance is determined visually by comparison with other samples. The results are expressed as a score ranging from 0 to 10, with a score of 0 corresponding to a paper having very poor resistance and a score of 10 corresponding to a paper having excellent resistance.

Immediately after the coated paper has been prepared, measurements are made on a sample which has not been treated in an oven and also on a sample which has been treated in an oven for 5 minutes at 110° C.

Table 3 below indicates the nature and the proportion by weight of the solid constituents of the coating compositions corresponding to each of the examples, using as a binder, the interpolymer latex of the invention and to each of the comparative experiments carried out using, as the binder, either the latex of the corresponding copolymer A or the interpolymer composed of the copolymer A and the styrene polymer (control in Tables 1, 1' and 1").

The coating compositions are brought to a pH of 8.5 by adding aqueous ammonia solution. The solids content is adjusted to 60% by weight by adding water.

TABLE 3

|  | Comparative Experiments | | Examples 1 to 11 |
|---|---|---|---|
|  | (i) | (ii) |  |
| Kaolin | 100 | 100 | 100 |
| Sodium hexametaphosphate | 0.3 | 0.3 | 0.3 |
| Carboxymethylcellulose | 0.3 | 0.3 | 0.3 |
| Latex of copolymer A (i) | 12 | — | — |
| Latex of the interpolymer composed of the copolymer A and the styrene polymer (ii) | — | 12 | — |
| Interpolymer latex according to the invention | — | — | 12 |

Tables 4 and 5 which follow indicate the values of the wet picking resistance of the coated paper for each of the examples and each of the corresponding comparative experiments.

TABLE 4

|  | Wet picking resistance | | | | | |
|---|---|---|---|---|---|---|
|  | Comparative experiment | Examples | | | | |
|  | (i) | 1 | 2 | 5 | 9 | 10 | 11 |
| Sample not treated in an oven | 3 | 6 | 3 | 5 | 4 | 3 | 3 |
| Sample treated in an oven | 6 | 10 | 8 | 7 | 8 | 8 | 8 |

TABLE 5

|  | Comparative experiment | Examples | | | | |
|---|---|---|---|---|---|---|
|  | (ii) | 3 | 4 | 6 | 7 | 8 |
| Sample not treated in an oven | 2 | 7 | 4 | 4 | 5 | 8 |
| Sample treated in an oven | 5 | 9 | 7 | 8 | 6 | 5 |

It is seen that aqueous compositions containing, as binders, the interpolymer latices according to the invention produce a coated paper having a better wet picking resistance than paper coated with aqueous compositions containing, as binders, either the latices of the corresponding copolymers A or latices of interpolymers composed of the copolymer A and a styrene polymer.

What is claimed is:

1. An interpolymer latex, wherein said interpolymer comprises
   (a) a copolymer A of butadiene, styrene and at least one ethylenically unsaturated carboxylic acid, and
   (b) a polymer B of at least one halogenoalkyl or halogenoacetoxyalkyl ester of an ethylenically unsaturated monocarboxylic or dicarboxylic acid, said polymer B being at least partially grafted onto the copolymer A.

2. The latex of claim 1, wherein the interpolymer comprises 85 to 99% by weight of copolymer A and 15 to 1% by weight of polymer B.

3. The latex of claim 1, wherein the copolymer A is of by weight, 15 to 85% of butadiene, 5 to 84% of styrene and 1 to 10% of at least one ethylenically unsaturated carboxylic acid.

4. The latex of claim 1, wherein the polymer B is of, by weight, 15 to 100% of said halogenoalkyl and/or halogenoacetoxyalkyl ester and 0 to 85% of at least one other ethylenically unsaturated compound which can be copolymerized with said halogenoalkyl or halogenoacetoxyalkyl ester.

5. The latex of claim 1, wherein the halogenoalkyl or halogenoacetoxyalkyl ester is represented by the general formula: RCOOZ, in which: Z represents:

the radical —$C_nH_{2n-m+1}X_m$, in which X represents a halogen atom, n is an integer ranging from 1 to 6, and m is an integer ranging from 1 to 5; or the radical —$(CH_2-CHY)_{n'}$—OOC—$CH_{(3-m')}X_{m'}$, in which X has the same definition as above, $n'$ is an integer from 1 to 4, $m'$ is an integer from 1 to 3, and Y represents a hydrogen atom or a methyl group; and R represents:

a linear or branched $C_2$-$C_4$ alkenyl group;

a linear or branched $C_2$-$C_4$ chloroalkenyl group; or a radical —$R'$—$COOZ'$, in which $Z'$ represents a hydrogen atom or the radical Z, and $R'$ represents a linear or branched $C_2$-$C_4$ alkenylene group, a linear or branched $C_2$-$C_4$ chloroalkenylene group or a group

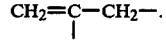

6. The latex of claim 5, wherein X represents chlorine or bromine, n is an integer ranging from 1 to 4, and m is an integer ranging from 1 to 3.

7. The latex of claim 1, wherein that part of the interpolymer which is insoluble in isopropyl alcohol represents at least 75% of the interpolymer and includes, in the grafted state, 0.2 to 15% by weight of the halogenoalkyl or halogenoacetoxyalkyl ester.

8. The latex of claim 1, wherein the carboxylic acid of the copolymer A is selected from the group consisting of acrylic acid, methacrylic acid, crotonic acid, itaconic acid, maleic acid, fumaric acid and a mixture thereof.

9. The latex of claim 4, wherein said compound which can be copolymerized with the halogenoalkyl or halogenoacetoxyalkyl ester is selected from the group consisting of vinylaromatic compounds, vinyl halides, vinyl halides, vinylidene halides, dienic compounds, carboxylic acid vinyl esters and acrylic compounds.

10. The latex of claim 9, wherein said compound which can be copolymerized with said halogenoalkyl or halogenoacetoxyalkyl ester is selected from the group consisting of styrene, α-methylstyrene, para-tert-butylstyrene, chlorostyrene, vinyltoluene, vinyl chloride, vinyl bromide, vinyl fluoride, vinylidene chloride, butadiene, isoprene, chloroprene, acrylic acid, methacrylic acid, fumaric acid, itaconic acid, chlorine derivatives of acrylic, methacrylic, fumaric and itaconic acids, acrylamide, methacrylamide, acrylonitrile, methacrylonitrile, chloroacrylonitrile, vinyl acetate, acrylic acid esters and methacrylic acid esters.

11. The latex of claim 10, wherein said compound which can be copolymerized with said halogenoalkyl or halogenoacetoxyalkyl ester is selected from the group consisting of methyl acrylate, ethyl acrylate, hydroxyethyl acrylate, hydroxypropyl acrylate, n-butyl acrylate, isobutyl acrylate, methyl methacrylate, ethyl methacrylate, hydroxyethyl methacrylate, hydroxypropyl methacrylate, n-butyl methacrylate and isobutyl methacrylate.

12. A process for the preparation of the latex of claim 1, comprising the steps of
(a) preparing a copolymer latex by the emulsion polymerization of butadiene, styrene and at least one copolymerizable, ethylenically unsaturated carboxylic acid, and
(b) polymerizing in the presence of said copolymer latex at least one halogenoalkyl or halogenoacetoxyalkyl ester of an ethylenically unsaturated monocarboxylic or dicarboxylic acid.

13. The process of claim 12 wherein at least one halogenoalkyl or halogenoacetoxyalkyl ester is polymerized in the presence of said copolymer along with at least one ethylenically unsaturated compound which can be copolymerized with the halogenoalkyl or halogenoalkoxyalkyl ester.

14. A process for the preparation of the latex of claim 1, comprising the steps of
(a) preparing a copolymer latex by the emulsion polymeritation of butadiene, styrene and at least one copolymerizable, ethylenically unsaturated carboxylic acid, and
(b) polymerizing, during the emulsion polymerization of said copolymer latex, at least one halogenoalkyl or halogenoacetoxyalkyl ester of an ethylenically unsaturated monocarboxylic or dicarboxylic acid.

15. A binder comprising the latex of claim 1.

16. Aqueous compositions for coating paper comprising a pigment and a binder, the binder being the latex of claim 1.

* * * * *

UNITED STATES PATENT AND TRADEMARK OFFICE
CERTIFICATE OF CORRECTION

PATENT NO. : 4,448,923
DATED : May 15, 1984
INVENTOR(S) : ROLAND REEB ET AL.

It is certified that error appears in the above—identified patent and that said Letters Patent is hereby corrected as shown below:

Claim 9, line 5, delete "vinyl halides,".

Signed and Sealed this

Twenty-fifth Day of September 1984

[SEAL]

*Attest:*

GERALD J. MOSSINGHOFF

*Attesting Officer*  *Commissioner of Patents and Trademarks*